(12) United States Patent
Yoshida (10) Patent No.: US 7,580,865 B2
(45) Date of Patent: Aug. 25, 2009

(54) CUSTOMER SOLICITATION SUPPORT SYSTEM AND INFORMATION PROVISION SERVER

(75) Inventor: Masanori Yoshida, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1053 days.

(21) Appl. No.: 10/669,717

(22) Filed: Sep. 25, 2003

(65) Prior Publication Data

US 2004/0064378 A1  Apr. 1, 2004

(30) Foreign Application Priority Data

Sep. 27, 2002 (JP) .............................. 2002-283264
Sep. 27, 2002 (JP) .............................. 2002-283265

(51) Int. Cl.
G06Q 30/00 (2006.01)
G06Q 10/00 (2006.01)
G06G 1/12 (2006.01)

(52) U.S. Cl. .............................. 705/26; 705/21; 705/28

(58) Field of Classification Search .................... 705/28
See application file for complete search history.

(56) References Cited

U.S. PATENT DOCUMENTS

2002/0165803 A1* 11/2002 Iwase et al. ................... 705/28
2003/0220835 A1* 11/2003 Barnes, Jr. ................... 705/14

FOREIGN PATENT DOCUMENTS

| JP | 06-019926 A | 1/1994 |
| JP | 9-171591 A | 6/1997 |
| JP | 9-179910 A | 7/1997 |
| JP | 11-7467 A | 1/1999 |
| JP | 2001-312507 A | 11/2001 |
| JP | 2002-32560 A | 1/2002 |
| JP | 2002-117066 A | 4/2002 |
| JP | 2002-117426 A | 4/2002 |
| JP | 2002-149773 A | 5/2002 |
| JP | 2002-175457 A | 6/2002 |
| JP | 2002-259791 A | 9/2002 |
| JP | 2002-279285 A | 9/2002 |

OTHER PUBLICATIONS

Keh, Hean Tat Teo, Chi Wei; Retail customers as partial employees in service provision: a conceptual framework; International Journal of Retail & Distribution Management, v29n8/9, p. 370-378, 2001.*

* cited by examiner

Primary Examiner—F. Zeender
Assistant Examiner—Faris Almatrahi
(74) Attorney, Agent, or Firm—Birch, Stewart, Kolasch & Birch, LLP

(57) ABSTRACT

The customer solicitation support system includes: a portable apparatus carried by a customer; a plurality of client computers installed in shops; and a server for exchanging information among the plurality of client computers. The server manages desired product information, which indicates a product desired by a customer in association with customer information of each customer, and stocked product information, which indicates stocked products of each shop, in a database in association with shop information. When the customer goes around shops carrying the portable apparatus, the customer information is sent to the server from the portable apparatus of the customer via the client computer wirelessly communicating with the portable apparatus. The server having received the customer information compares the desired product information associated with the received customer information and the stocked product information, and sends information on shops holding the desired product to the portable apparatus of the customer via the client computer communicating with the portable apparatus.

14 Claims, 8 Drawing Sheets

| ITEM | CONTENTS | NOTE (METHOD OF USING INFORMATION, ETC.) |
|---|---|---|
| PRODUCT A<br>SHOP INFORMATION<br>(SHOP NAME,<br>SHOP LOCATION PA (XA, YA)) | PRODUCT NAME, KEYWORD, AMOUNT OF STOCK, PRICE, MANAGEMENT PERIOD | INFORMATION IS REGISTRABLE NOT ONLY AS NAME OF PRODUCT ITSELF BUT ALSO AS KEYWORD INFORMATION SO AS TO MAKE IT POSSIBLE TO DEAL WITH CUSTOMER WHEN THE CUSTOMER HAS ONLY VAGUE PRODUCT IMAGE. |
| PRODUCT B<br>SHOP INFORMATION<br>(SHOP NAME,<br>SHOP LOCATION PB (XB, YB)) | PRODUCT NAME, KEYWORD, AMOUNT OF STOCK, PRICE, MANAGEMENT PERIOD | INFORMATION IS REGISTRABLE NOT ONLY AS NAME OF PRODUCT ITSELF BUT ALSO AS KEYWORD INFORMATION SO AS TO MAKE IT POSSIBLE TO DEAL WITH CUSTOMER WHEN THE CUSTOMER HAS ONLY VAGUE PRODUCT IMAGE. |
| o o o o o o | | |
| o o o o o o | | |

| ITEM | CONTENTS | NOTE (METHOD OF USING INFORMATION, ETC.) |
|---|---|---|
| DESIRED PRODUCT | PRODUCT NAME, KEYWORD | INFORMATION IS REGISTRABLE NOT ONLY AS NAME OF PRODUCT ITSELF BUT ALSO AS KEYWORD INFORMATION SO AS TO MAKE IT POSSIBLE TO DEAL WITH CUSTOMER WHEN THE CUSTOMER HAS ONLY VAGUE PRODUCT IMAGE. |
| DESIRE TO PURCHASE | LEVEL (E.G., FIVE LEVELS) | TO MAKE IT POSSIBLE TO REGISTER DESIRE TO PURCHASE OF CUSTOMER, AND USE IT AS INFORMATION FOR NARROWING DOWN CUSTOMERS TO WHOM SHOP WILL APPROACH ACCORDING TO DEGREE OF DESIRE TO PURCHASE |
| METHOD OF PAYMENT | CASH, CREDIT CARD | TYPES OF CREDIT CARD, ETC. AVAILABLE FOR CHECKING PAYMENT CREDIBILITY OF CUSTOMER ACCORDING TO INFORMATION FROM CREDIT CARD COMPANY OR THE LIKE |
| CUSTOMER INFORMATION | IMAGE DATA OF USER (CUSTOMER) USER ID | USED AS INFORMATION TO APPROACH CUSTOMER FROM SHOP CLERK WHEN THE CUSTOMER HAS APPROACHED SHOP |

FIG.8

CUSTOMER SOLICITATION SUPPORT SYSTEM AND INFORMATION PROVISION SERVER

This nonprovisional application claims priority under 35 U.S.C. § 119(a) on Patent Application No(s) 2002-283264 and 2002-283265 filed in JAPAN on Sep. 27, 2002, which is(are) herein incorporated by reference.

BACKGROUND OF THE INVENTION

1. Field of the Invention

The present invention relates to a customer solicitation support system and an information provision server, and in particular to a customer solicitation support system and an information provision server which are capable of retrieving a shop holding a product desired by a customer and sending information on the shop to a portable apparatus carried by the customer.

2. Description of the Related Art

Japanese Patent Application Publication No. 06-019926 discloses person intermediation computer network provided with a registration device with which a user wishing to search a desired partner registers own data and desire data in each computer terminal and a conforming person list preparation device which compares the registered desire data and partner data to cause a display device to display a list of partners with high conformity, and is constituted such that the customer can transfer a message including. characters and signs, voices, and images to a computer terminal of a specific partner, who is selected out of the conforming person list displayed on the display device, through an information transmission network via a character/sign information transmission and reception device or an image information transmission and reception device and, if the partner is available, can carry out a time application on a real time basis. Then, it is possible to search a desired partner with a high degree of reliability without consuming labor and cost.

However, in the above-described person intermediating computer network, although it is possible for a user wishing to search a desired partner to register own data and desire data and send an e-mail, a voice, or an image to a specific partner in a list of partners with high conformity with the desire data, a deficiency is caused in that shops holding a product desired by a customer in a shopping mall or the like cannot be notified to the customer, or a list of shops selling a product at a lowest price, shops closest to the customer, and the like cannot be notified to the customer. Moreover, on a shop side, a deficiency is caused in that information on a customer wishing to buy a desired product (a distance from the shop, personal information on the customer) cannot be obtained.

Japanese Patent Application Publication No. 09-179910 discloses an electronic intermediation system and a method therefor including an information management device, which receives setting information set by a user and holds the setting information for each user, and an information intermediation device which, without disclosing first setting information of a first user and second setting information of a second user, intermediates individual information included in the first and second setting information. Therefore, it is possible to electronically intermediate users, who do not know each other, and exchange individual information without disclosing individual information of the users.

However, in the above-described electronic intermediation system and the method therefor, although it is possible to exchange personal information by electronically intermediating users who do not know each other without disclosing users individually, a deficiency is caused in that shops holding a product desired by a customer in a shopping mall or the like cannot be notified to the customer, or a list of shops selling a product at a lowest price, shops closest to the customer, and the like cannot be notified to the customer. Moreover, on a shop side, a deficiency is caused in that information on a customer wishing to buy a desired product cannot be obtained. Further, a deficiency is caused in that people whose demand and supply coincide with each other cannot be introduced easily.

Japanese Patent Application Publication No. 11-007467 discloses an interpersonal product sale and purchase intermediation method and an apparatus therefor which register product information such as a product desired to be purchased and a model of the product, purchase information constituted by information such as purchase conditions, a desired purchase price, a name, an address, and an e-mail address of a person desiring purchase, product information such as a product desired to be sold and a model of the product, and sales information constituted by information such as sales conditions, a desired sales price, and a name, an address, and an e-mail address of a person desiring sales in a magnetic disk, respectively, retrieve sales information registered in advance when the purchase information is registered, and present a product list, which comprises parts other than information on the person desiring sales among sales information data meeting conditions, to a user. The user selects a favorite product out of the list to thereby obtain information such as a name, an address, a contact, an e-mail address of a person at the other end who has registered the product, communicate with the person at the other end, and trade the product. Therefore, both of a purchasing user and a selling user can participate in a trade on equal terms, it is possible to narrow down products according to conditions, and it is possible to secure privacy of the users.

In the above-described interpersonal product sales and purchase intermediation method and the apparatus therefor, purchase information such as information on a product desired to be purchased, a person desiring to purchase the product, and a desired purchase price and sales information such as information on a product desired to be sold, a person desiring to sell the product, and a desired sales price are registered in a database, respectively, only information on products and desired sales prices meeting conditions are presented to the person desiring to purchase the product, and the person desiring to purchase the product selects a favorite product out of the products to thereby obtain information on the person desiring to sell the product and carry out communication and trade with the other party. However, a deficiency is caused in that shops holding a product desired by a customer in a shopping mall or the like cannot be notified to the customer, or a list of shops selling a product at a lowest price, shops closest to the customer, and the like cannot be notified to the customer. Moreover, on a shop side, a deficiency is caused in that information on a customer wishing to buy a desired product cannot be obtained.

Japanese Patent Application Publication No. 2002-149773 discloses a product stock notification system and a method therefor, or the like which input stocked product information to a shop terminal apparatus and send the information to a server, send desired product information inputted by a customer to the server from a cellular phone, compare the stocked product information and the desired product information and, when both the product information coincide with each other, send authentication codes to the cellular phone and the shop terminal apparatus. Then, when a customer approaches the shop terminal apparatus during a walk, communication devices of the shop and the customer start communication each other through a short-range wireless communication device, the cellular phone receives the authentication code from the shop terminal apparatus to compare it with the authentication code received from the server and, if both the authentication codes coincide with each other, notifies the user of received information on the product. Therefore, when a user carrying a cellular phone approaches a shop which holds a desired product, it is possible to notify the user of information on the desired product.

However, in the above-described product stock notification system and the method therefor, or the like, although it is possible to provide a service for, in the case in which a product desired by a customer and a product held by a shop coincide with each other, notifying the customer to that effect through a cellular phone and attracting the customer to a shop, a deficiency is caused in that shops holding a product desired by a customer in a shopping mall or the like cannot be notified to the customer, or a list of shops selling a product at a lowest price, shops closest to the customer, and the like cannot be notified to the customer. Moreover, on a shop side, a deficiency is caused in that information on a customer wishing to buy a desired product cannot be obtained.

SUMMARY OF THE INVENTION

It is an object of the present invention to provide a customer solicitation support system which can provide customers of information on shops dealing in produce desired by the customers in a shopping mall or the like, provide shops with information on customers wishing to buy desired products, and easily introduce a customer and a shop whose demand and supply coincide with each other.

In order to attain the above-described object, the present invention is directed to a customer solicitation support system, comprising: a portable apparatus which is carried by a customer; a plurality of client computers which are installed in shops; and a server which exchanges information among the plurality of client computers, wherein the portable apparatus comprises: a first display device which displays shop information indicating shops having stock of a product desired by the customer; and a first communication device which wirelessly communicates with the client computers to send customer information indicating the customer carrying the portable apparatus and receive the shop information displayed on the first display device from one of the client computers closest to the customer; wherein each of the client computers comprises: a second communication device which wirelessly communicates with the first communication device of the portable apparatus to receive the customer information from the first communication device and send the shop information to the first communication device; and a third communication device which sends the customer information received by the second communication device to the server and receives the shop information sent by the second communication device from the server; and wherein the server comprises: a fourth communication device which receives the customer information from the portable apparatus via the client computers wirelessly communicating with the portable apparatus and sends the shop information which the first display device of the portable apparatus is caused to display; a customer information database which manages desired product information in association with customer information of each customer; a stock information database which manages stocked product information indicating stocked products in association with shop information of each shop; an extraction device which, upon receiving the customer information via the fourth communication device, extracts the desired product information associated with the customer information from the customer information database based upon the received customer information; and a control device which compares the desired product information extracted by the extraction device and the stocked product information registered in the stock information database, retrieves stocked product information coinciding with the desired product information, and outputs the shop information associated with the retrieved stocked price information to the fourth communication device.

According to the present invention, desired product information indicating a product desired by a customer is managed by the customer information database in association with customer information of each customer, and stocked product information indicating stocked products of each shop is managed by the stock information database in association with shop information.

When a customer goes around shops carrying a portable apparatus, customer information is sent to a server from the portable apparatus of the customer via a client computer wirelessly communicating with the portable apparatus. The server having received the customer information extracts desired product information associated with the customer information from the customer information database based upon the received customer information. Then, the server compares the extracted desired product information and stocked product information registered in the product information database, retrieves stocked product information coinciding with the desired product information, sends shop information associated with this retrieved stocked product information to the portable apparatus of the customer via the wirelessly communicating client computer, and causes the first display device of the portable apparatus to display the shop information. Consequently, the customer can obtain shop information of a shop holding stock of the desired product from the portable apparatus. The shop information includes location information of a shop, and the customer can learn a location of the shop holding stock of the desired product from the received shop information.

Preferably, the customer solicitation support system further comprises: a customer information input apparatus which comprises: an input device which inputs customer information indicating the customer carrying the portable apparatus together with the desired product information associated with the product desired by the customer; and a fifth communication device which communicates with the fourth communication device of the server and sends the desired product information and the customer information inputted by the input device to the server.

According to the present invention, the customer information input apparatus is set in, for example, an entrance or the like of a shopping mall, and the customer uses this customer information input apparatus to input the desired product information associated with the customer information. The input device of the customer information input apparatus can input a face image of the customer together with the desired product information and the customer information.

Preferably, the portable apparatus comprises an input device which inputs the desired product information associated with the product desired by the customer; and the first communication device sends the desired product information together with the customer information. Moreover, the input device of the portable apparatus can input a face image of the customer together with the desired product information and the customer information. That is, the desired product information and the face image of the customer may be inputted by the input device of the portable apparatus in association with the desired product information and the customer information.

Preferably, each of the client computers comprises a second display device which displays the face image of the customer and desired product information; and the fourth communication device sends the face image of the customer and the desired product information which the second display device is caused to display. According to the present invention, shop clerks or the like of shops where the client computers are installed can learn the customer (face of the customer) desiring to purchase stocked products of the shops and call in the customer.

Preferably, the server comprises a customer existing location detection device which detects an existing location of the customer; and the control device outputs the shop information of the shop close to the existing location of the customer, which is detected by the customer existing location detection device, preferentially to the fourth communication device among the shop information associated with the retrieved stocked product information. According to the present invention, the customer can learn the closest shop among shops holding stock of the desired product.

Preferably, each of the first communication device of the portable apparatus and the second communication device of the client computers is a short-range wireless communication device which performs wireless communication only in a predetermined communication area; and the customer existing location detection device of the server detects the customer existing location based upon an installation location of the client computer which has sent the customer information to the server. For example, each of the first communication device of the portable device and the second communication device of the client computers is a short-range wireless communication device of the Bluetooth standard.

Preferably, the stocked product information managed by the stock information database includes prices of the stocked products; and the control device outputs the shop information of the shop, which sets low prices to the stocked products, preferentially to the fourth communication device among the shop information associated with the retrieved stocked price information. According to the present invention, the customer can learn a shop which sets a low price to a desired product among shops holding stock of the desired product.

Preferably, each of the client computers comprises an input device which inputs stocked product information; each of the client computers sends the shop information to the server together with the stocked product information via the third communication device; and the server comprises a database management device which, upon receiving the stocked product information and the shop information via the fourth communication device, registers the stocked product information in the stock information database in association with the shop information.

Preferably, each of the client computers comprises an input device which inputs product purchase information indicating that the customer has purchased the desired product; each of the client computers sends the customer information to the server together with the product purchase information inputted by the input device via the third communication device; and the server comprises a database management device which, upon receiving the product purchase information and the customer information inputted by the input device, deletes the desired product information, which is registered in association with the customer information, from the customer information database together with the received customer information.

Preferably, the server comprises a database management device which manages terms of validity for the desired product information registered in the customer information database and the stocked product information registered in the stock information database, respectively, and deletes the desired product information and the stock product information, the terms of validity of which have expired, from the customer information database and the stock information database.

Preferably, each of the first communication device of the portable apparatus and the second communication device of the client computers is a short-range wireless communication device which performs wireless communication only in a predetermined communication area; each of the client computers sends information, which indicates whether or not the each of the client computer is wirelessly connected to the portable apparatus, to the server via the third communication device; and the server comprises a database management device which, upon receiving information, which indicates that the portable apparatus is not wirelessly connected to the each of the client computers, via the fourth communication device, deletes the customer information corresponding to the portable apparatus from the customer information database.

The present invention is also directed to an information provision server which exchanges information with a plurality of client computers installed in shops, comprising: a communication device which receives customer information indicating a customer carrying a portable apparatus from a client computer wirelessly communicating with the portable apparatus of the customer and sends shop information for causing a display device of the portable apparatus to display shop information relating to a shop holding stock of a product desired by the customer; a customer information database which manages desired product information relating to the product desired by the customer in association with the customer information received by the communication device; a stock information database which manages stocked product information of stocked products of the shops as stock information in association with the shop information; and a control device which compares the desired product information included in the customer information managed by the customer information database and the stocked product information included in the stock information managed by the stock information database, retrieves the stock information having the stocked product information coinciding with the desired product information, and outputs the shop information included in the retrieved stocked product information to the communication device.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Detailed description will hereunder be given of the preferred embodiment of a customer solicitation support system and an information provision server according to the present invention with reference to the accompanying drawings.

Figure 1:
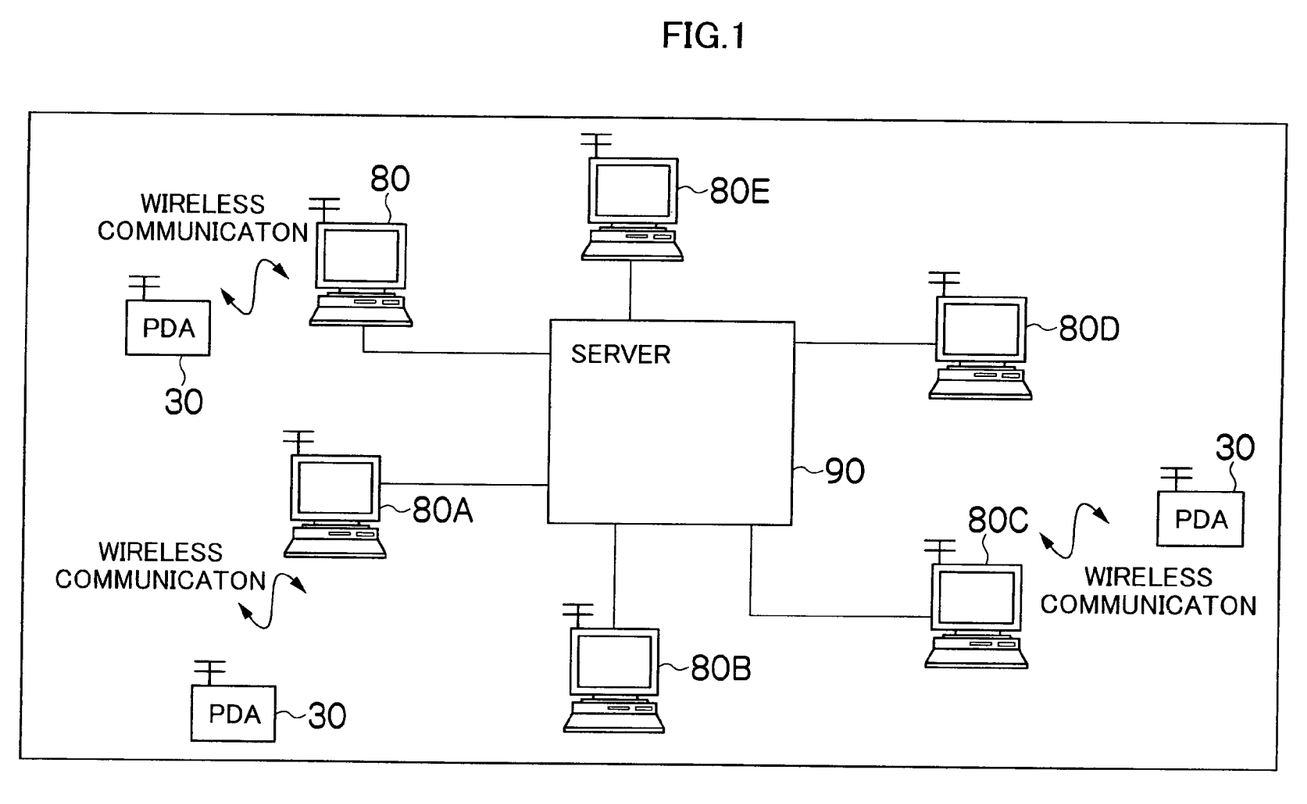
FIG. 1 is an overall diagram of a customer solicitation support system in accordance with the present invention.

FIG. 1 shows an overall diagram of a customer solicitation support system in accordance with the present invention.

As shown in FIG. 1, the customer solicitation system includes a Personal Digital Assistant (PDA) 30 carried by a customer 10, client personal computers (PCs) 80 and 80A to 80E which are provided at an entrance of a shopping mall and in shops, an information provision server 90 which is capable of carrying out transmission and reception of information with the client PCs 80 and the like.

The PDA 30 carried by the customer 10 and the client PCs 80 and the like are provided with a short-range wireless communication device based upon a communication standard such as Bluetooth and are capable of carrying out transmission and reception of information between the apparatuses. The PDA 30 may be a small-sized personal computer, which can be easily carried, or may be a portable apparatus such as an electronic notepad, a cellular phone, or an electronic camera.

The client PCs 80 and the like are provided with a communication interface for a LAN, the Internet, or the like which is capable of carrying out transmission and reception of information with the server 90.

A schematic processing operation of the customer solicitation support system in accordance with the present invention will be hereinafter described.

The PDA 30 carried by the customer carries out wireless communication with the client PCs 80 and the like, and sends desired product information on a product which the customer desired to purchase and information for specifying the customer (customer information) including a face image of the customer to the client PCs 80 and the like. Next, the client PCs 80 and the like send shop information of the shops (e.g., location information of shops and shop names), where the client PCs are installed, and the customer information to the server 90.

The server 90 retrieves stocked product information including a product coinciding with or similar to the desired product information, which is registered in association with the received customer information, sends the shop information, which is registered in association with the retrieved stocked product information, to the client PCs 80 and the like, and sends the face image of the customer included in the customer information to the client PCs 80 and the like.

The client PCs 80 and the like display the received face image of the customer on the display devices and send the received shop information of shops holding the stocked product to the PDA 30 of the customer.

The PDA 30, which has received the information on shops holding stock of the product the customer desires to purchase, is capable of displaying the information on shops holding the product on the display device (names and locations of shops) and notifying the customer of the information.

Figure 2:
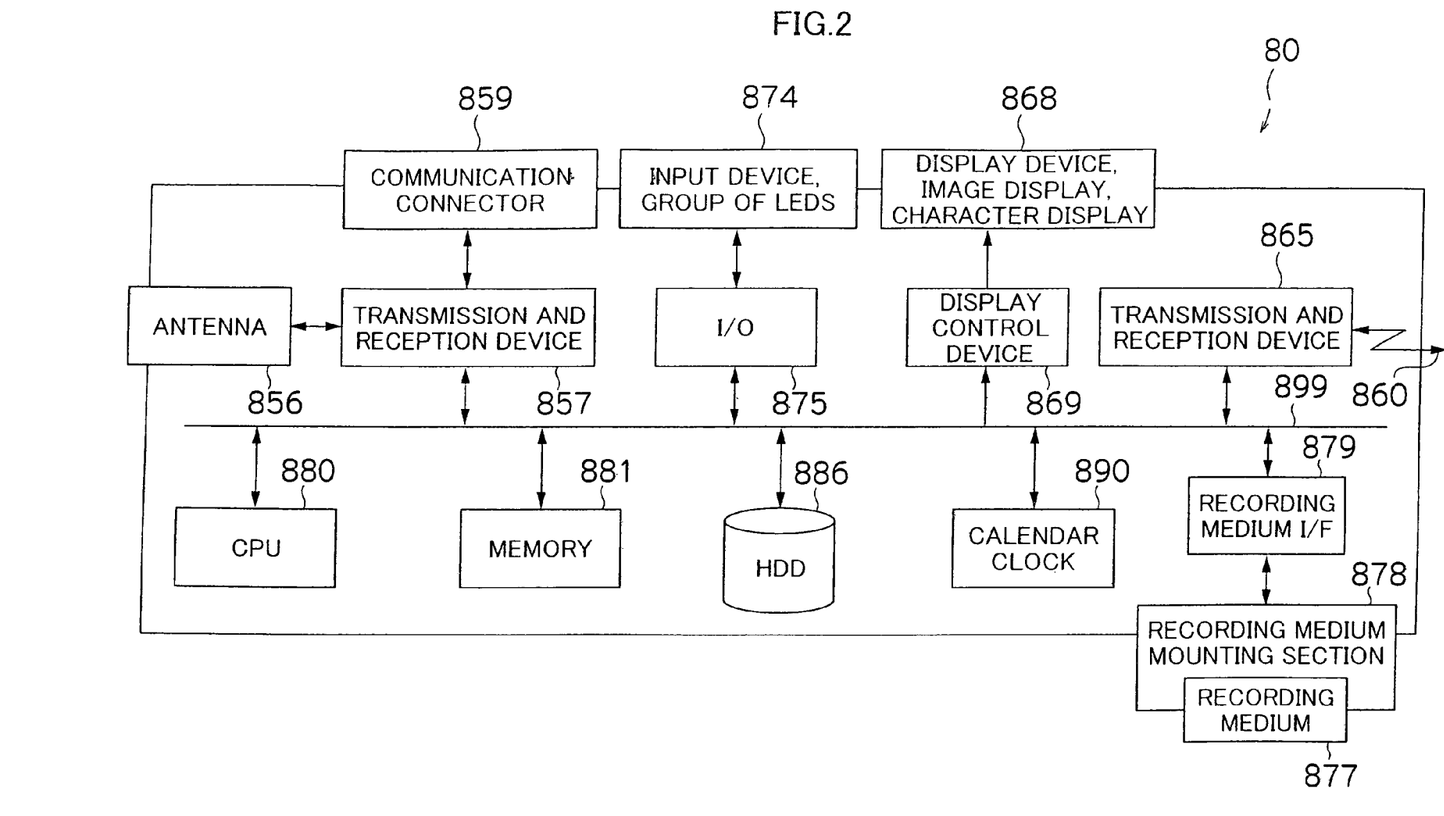
FIG. 2 is a block diagram of a client computer.

FIG. 2 shows a block diagram of the client PC 80.

As shown in FIG. 2, the client PC 80 includes a short-range wireless communication device, which includes an antenna 856 transmitting and receiving information to and from the PDA 30, and a transmission and reception device 865 for a communication network 860 for transmitting and receiving information to and from other communication apparatuses (server 90, etc.) via the communication network 860 such as the Internet or a LAN.

The client PC 80 further includes a display device 868 which displays a face image, characters, and other information, a display control device 869 which outputs an image signal for display to the display device 868 based upon a command of a Central Processing Unit (CPU) 880, and an Input-output (I/O) port 875 which reads various kinds of information inputted by a shop clerk or the like via an input device 874 to transmit the information to the CPU 880 or outputs a display command to a notification device such as an LED based upon an instruction from the CPU 880.

The client PC 80 further includes a recording medium mounting section 878 to which a recording medium 877 is mounted and a recording medium interface 879 which records information such as image data in and reads out the information from the recording medium 877. The recording medium 877 is a detachable recording medium of a magnetic recording system, an optical recording system, or the like.

The client PC 80 further includes the CPU 880 which performs overall control of the client PC 80, a memory 881 which is constituted by a ROM having recorded therein a program for operating the CPU 880 and various constants and a RAM serving as a recording device to be a work area when the CPU 880 executes processing, a recording device 886 such as a hard disk which records various constants for processing of the client PC 80, connection information such as a dial-up telephone number, attribute information, a Uniform Resource Locators (URL), an address, a site address, a gateway information Domain Name System (DNS), and information on a location where the client PC 80 is installed (shop information), and a calendar clock 890 which records the passing moments.

As shown in FIG. 2, the CPU 880 in the client PC 80 and peripheral circuits including the display control device 869, the I/O port 875, the memory 881, the recording device 886, the calendar clock 890, and the like are connected with each other through a bus 899. The CPU 880 is capable of controlling the peripheral circuits and is capable of controlling the peripheral circuits based upon a processing program executed by the CPU 880.

The above-described short-range wireless communication device is a wireless communication device of the Bluetooth standard. When a PDA carried by a customer enters a predetermined communication area of any one of client PCs, the PDA and the client PC start wireless communication and, when the PDA moves to the outside of the communication area, the communication is disconnected. The short-range wireless communication device is not limited to the wireless communication device of the Bluetooth standard but may be a wireless communication device using ultrasonic waves or infrared rays as a carrier wave.

The transmission and reception device 857 is capable of carrying out wireless communication with the PDA 30 carried by the client to receive the desired product information on the desired product and the customer information including a face image of the customer.

On the other hand, the transmission and reception device 865 is capable of sending the customer information received from the PDA 30 carried by the customer, the location information of the shop where the client PC 80 is installed, and the shop information including the shop name to the server 90. Identification information of the client PC 80 may be sent as shop information instead of the shop information. In this case, the server 90 may be provided with a storage device which stores identification information of a client PC and location information and a name of a shop where the client PC is installed in association with each other to read out the location information and the name of the shop where the client PC is installed from the storage device based upon the received identification information of the client PC.

The transmission and reception device 865 is capable of receiving customer information including stored product information, shop information, and customer information including a face image of a customer from the server 90 and sending the received shop information to the PDA 30 and is capable of displaying the customer information received from the server 90 on the display device 868 of the client PC.

Further, the CPU 880 is capable of detecting that wireless communication which has been carried out with the PDA 30 carried by the customer has been disconnected.

The input device 874 is capable of inputting product purchase information on a product purchased by a customer.

The transmission and reception device 865 is capable of sending the inputted product purchase information and wireless communication disconnection information indicating disconnection of the wireless communication to the server 90.

Figure 3:
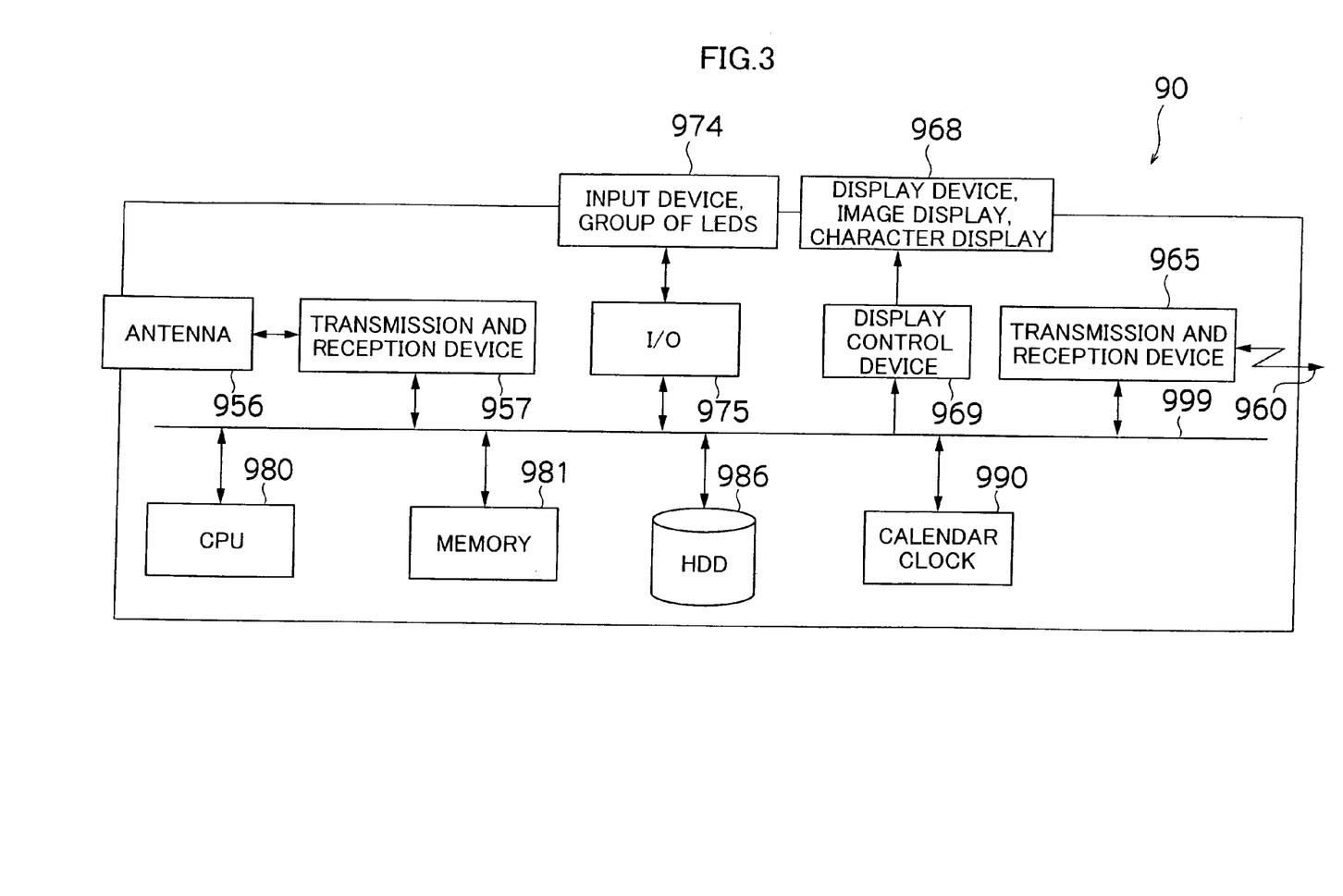
FIG. 3 is a block diagram of an information provision server in accordance with the present invention.

FIG. 3 shows a block diagram of the server 90 in accordance with the present invention.

As shown in FIG. 3, the server 90 includes an antenna 956 which is used as a wireless communication device, a transmission and reception device 957 which converts data into a predetermined format in order to send and receive information wirelessly or by wire, and a transmission and reception device 965 which transmits and receives information to and from other communication apparatuses (the client PC 80, the PDA 30, etc.) via a communication network 960 such as a LAN or the Internet.

The server 90 further includes a display device 968 which displays information such as an image or characters, if necessary, for confirmation, a display control device 969 which outputs an image signal for display to the display device 968 based upon a command of a CPU 980 described later, and an I/O port 975 which reads various kinds of information inputted by an administrator via an input device 974 and transmits the information to the CPU 980 or outputs a display command to an LED or the like based upon an instruction from the CPU 980.

The server 90 further includes the CPU 980 which controls the entire server 90, a memory 981 constituted by a ROM having recorded therein a program and various constants for operating the CPU 980 and a RAM serving as a recording device to be a work area at the time when the CPU 980 executes processing, a recording device 986 such as a hard disk which records various constants for processing of the server 90, own attribute information on a network, connection information such as a URL, an address, a site address, and a gate way information DNS, customer information, stocked product information, shop information, a management period of the stocked product information, and other various information, and a calendar clock 990 which records the passing moments.

As shown in FIG. 3, the CPU 980 and peripheral circuits including the display control device 969, the I/O port 975, the memory 981, the recording device 986, the calendar clock 990, and the like are connected by a bus 999. The CPU 980 is capable of controlling the peripheral circuits and is capable of controlling devices around it based upon a processing program executed by the CPU 980.

The recording device 986 is capable of recording stocked product information indicating products which can be sold, a management period for the stocked product information, and shop information on shops holding the products which can be sold in association with each other.

The transmission and reception device 965 is capable of receiving location information of shops where the client PCs 80 and the like are installed, desired product information on a desired product, and customer information including a face image of the customer from the client PCs 80 and the like.

Upon receiving the customer information from the client PCs 80 and the like, the CPU 980 is capable of retrieving stocked product information coinciding with or similar to the desired product information registered in association with the received customer information out of the stocked product information recorded in the recording device 986 and reading out shop information associated with the stocked product information.

The transmission and reception device 965 is capable of sending the shop information and customer information that are read by the CPU 980 to the client PCs 80 and the like.

The transmission and reception device 965 is capable of receiving customer information, product purchase information, and wireless communication disconnection information from the client PCs 80 and the like.

The CPU 980 is capable of updating customer information and stored product information based upon the received product purchase information and wireless communication disconnection information.

Further, the CPU 980 is capable of comparing the management period for the stored product recorded in the recording device 986 and time and date counted by the calendar clock 990 to judge whether or not the management period for the stocked product has expired and, if it is judged that the management period for the stocked product has expired, performing processing for deleting the stocked product information which is recorded in association with the management period.

Figure 4:
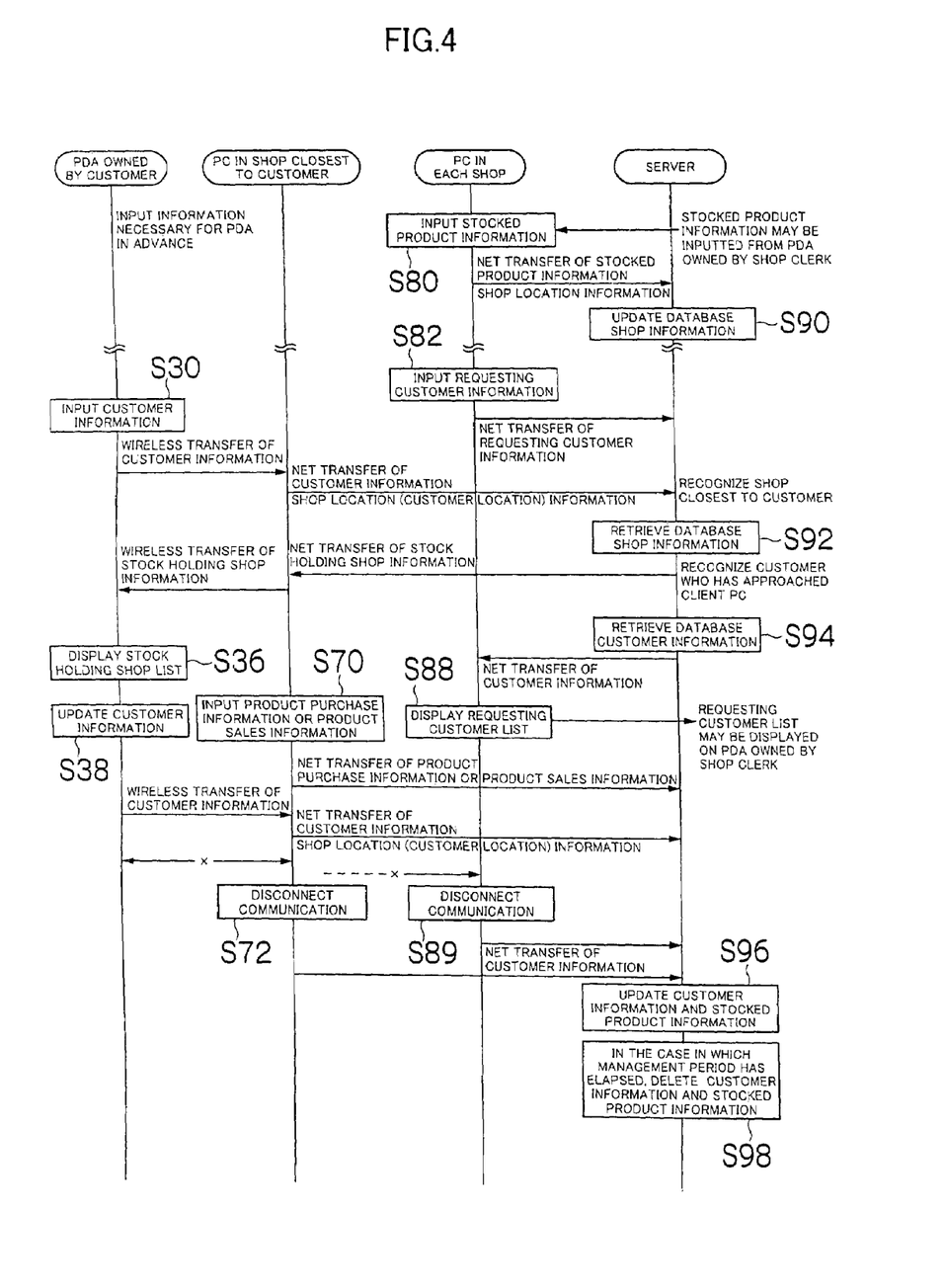
FIG. 4 is an event trace diagram of customer solicitation support processing in accordance with the present invention.

FIG. 4 shows an event trace diagram of customer solicitation support processing in accordance with the present invention.

First, in step S80 (hereinafter abbreviated as S80) "input stocked product information", the client PC 80, 80A, or the like in each shop performs processing for inputting stocked product information on a stocked product via the input device 874 such as a keyboard from a shop clerk of the shop. The stocked product information may be inputted via the transmission and reception device 857 from a PDA owned by the shop clerk instead of inputting the stocked product information via the input device 874. Here, the stocked product information inputted by the client PC 80 or the like is information such as a name of a stocked product, a keyword at the time of product retrieval, a quantity of stock, and a price.

When the stocked product information is inputted by the shop clerk of the shop and an instruction to send the stocked product information to the server 90 is further inputted, the CPU 880 of the client PC 80 or the like performs processing for sending the inputted stocked product information to the server 90 via the transmission and reception device 865 and the communication network 860. In sending the stocked product information, the CPU 880 reads out shop information of shops (location information of shops and shop names), where the client PCs are installed, from the recording device 886, and sends the information to the server 90 together with the stocked product information.

The CPU 980 of the server 90 receives the stocked product information and the shop information via the transmission and reception device 965. Then, in S90 "update database stock information", the CPU 980 registers the received stocked product information in the stock information database in association with the shop information.

Figure 5:
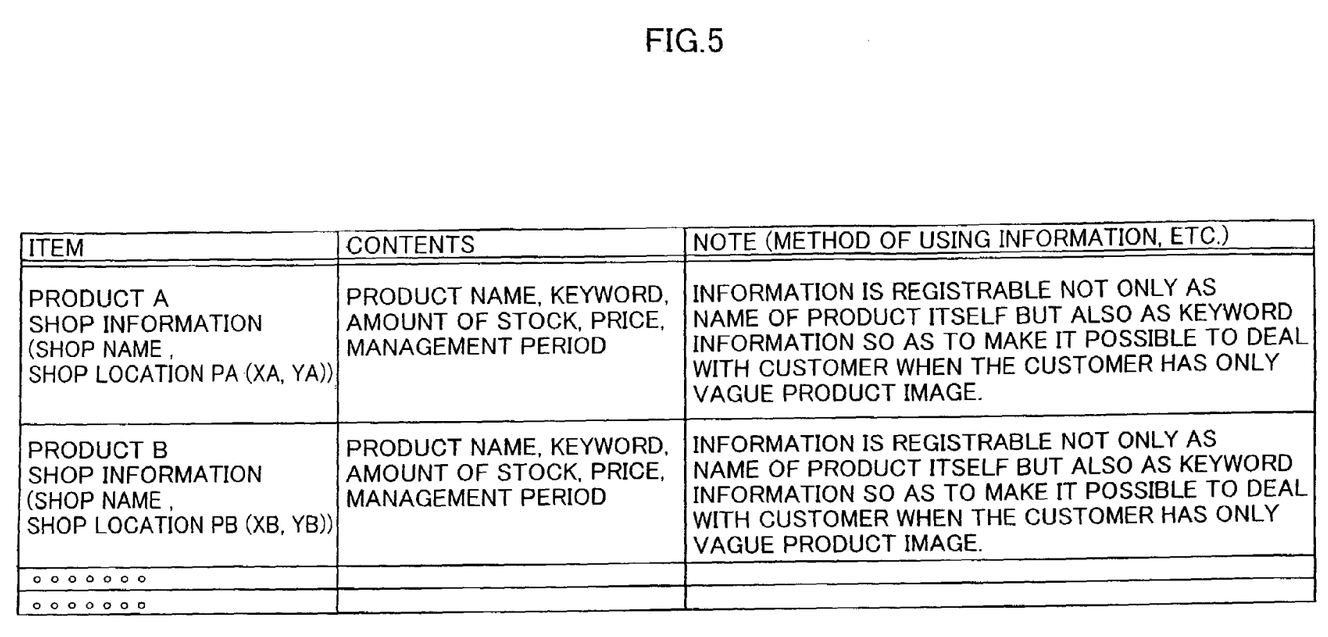
FIG. 5 is a diagram showing stock information recorded in a recording device of a server.

FIG. 5 shows a structure of the stock information database stored in the recording device 986 of the server 90.

In an example shown in FIG. 5, stocked product information on stocked products and shop information of shops (shop names, shop locations) holding the stocked products are registered in the stock information database in association with each other. The stocked product information includes information such as a product name of a stocked product, a keyword for retrieving the stocked product, a quantity of stock, a price, and a management period (data of registration in the stock information database).

Figure 6:
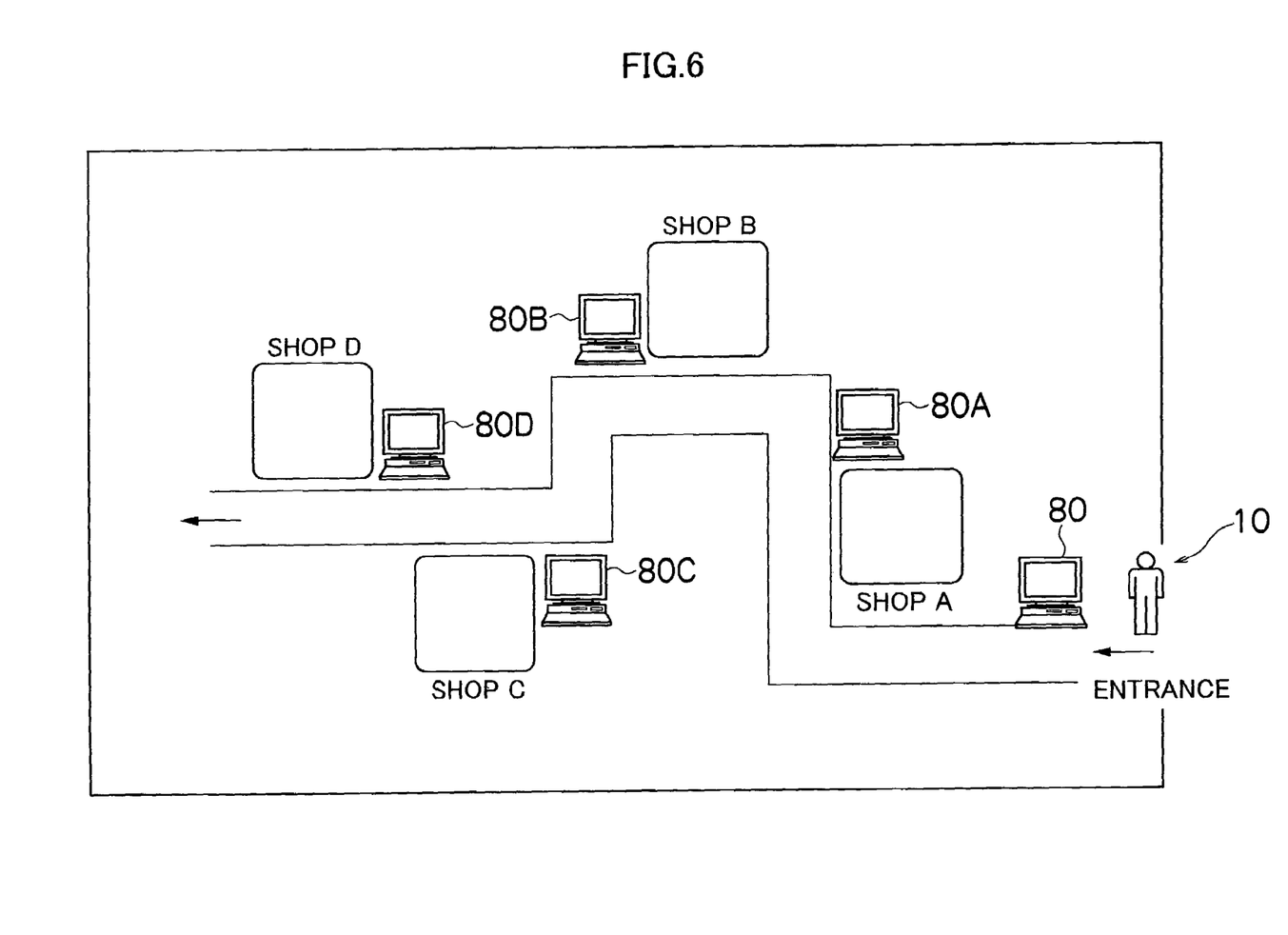
FIG. 6 is a diagram showing a concept of a shopping mall.

FIG. 6 shows a conceptual diagram of a shopping mall.

In an example shown in FIG. 6, the customer 10 enters the shopping mall from an entrance thereof and enjoys shopping passing the vicinity of shops A, B, C, and D. For example, the customer 10 operates the input device 874 such as a keyboard or a mouse, which is provided in the client PC 80 installed at the entrance of the shopping mall, to input customer information such as a face image of the customer.

Then, various kinds of customer information is inputted to the CPU 880 of the client PC 80 from the customer 10 via the input device 874 in S82 "input requested customer information" shown in FIG. 4. For example, information on a location where the client PC 80 is installed is recorded in the recording device 886 of the client PC 80, and the CPU 880 reads out the location information from the recording device 886 and sends the location information to the server 90 via the transmission and reception device 865 and a communication network such as the Internet together with the inputted customer information.

Figure 7:
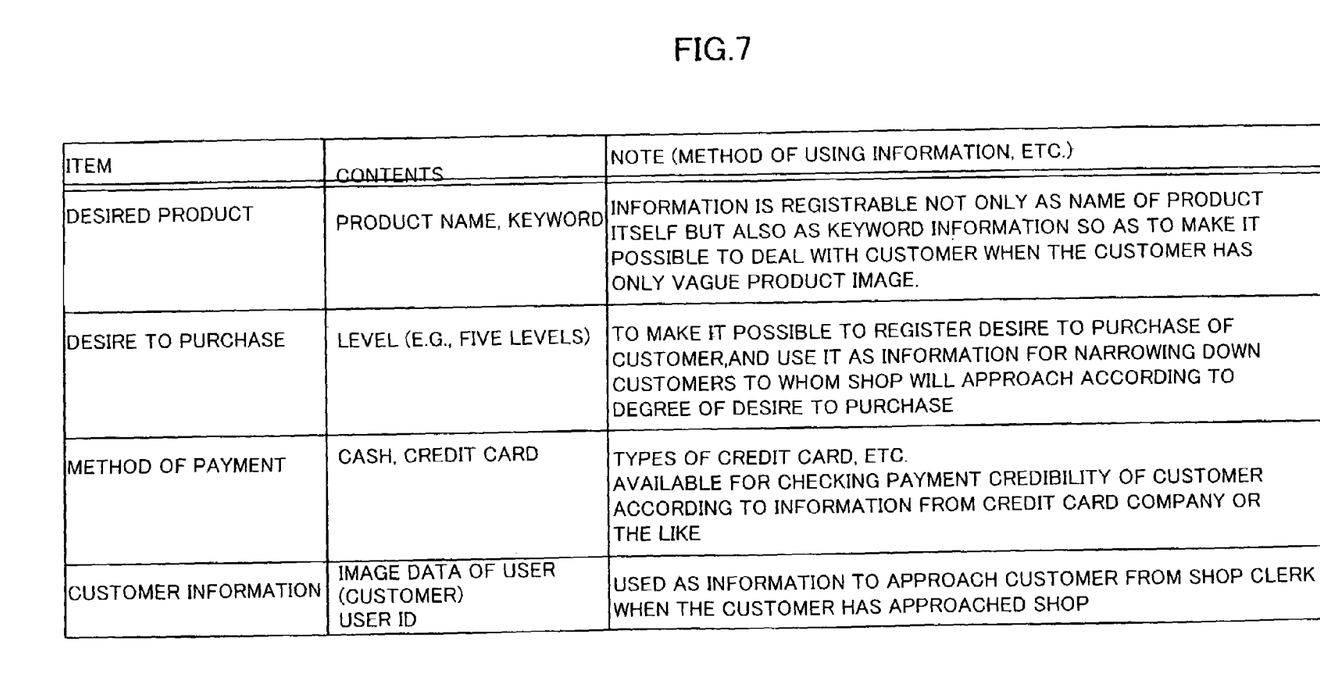
FIG. 7 is a diagram showing an example of customer information inputted by a customer.

FIG. 7 shows a structure of a customer information database stored in the recording device 986 of the server 90.

As shown in FIG. 7, information on a product name of a product desired by a customer and a keyword for specifying the desired product, a level of desire to purchase, and a method of payment at the time when a product is purchased, and customer information including a face image and a customer ID of the customer are registered in the customer information database. In the case in which the face image of the customer 10 is inputted to the client PC 80, the client 10 picks up to input the face image by operating an image pickup device constituted by an image pickup lens, a CCD, and the like which is provided in the client PC 80.

Instead of the customer 10 directly inputting the customer information by operating the input device 874 of the client PC 80, the PDA 30 carried by the client 10 and the client PC 80 may communicate wirelessly, whereby the customer information is received from the PDA 30 and inputted to the client PC 80.

Figure 8:
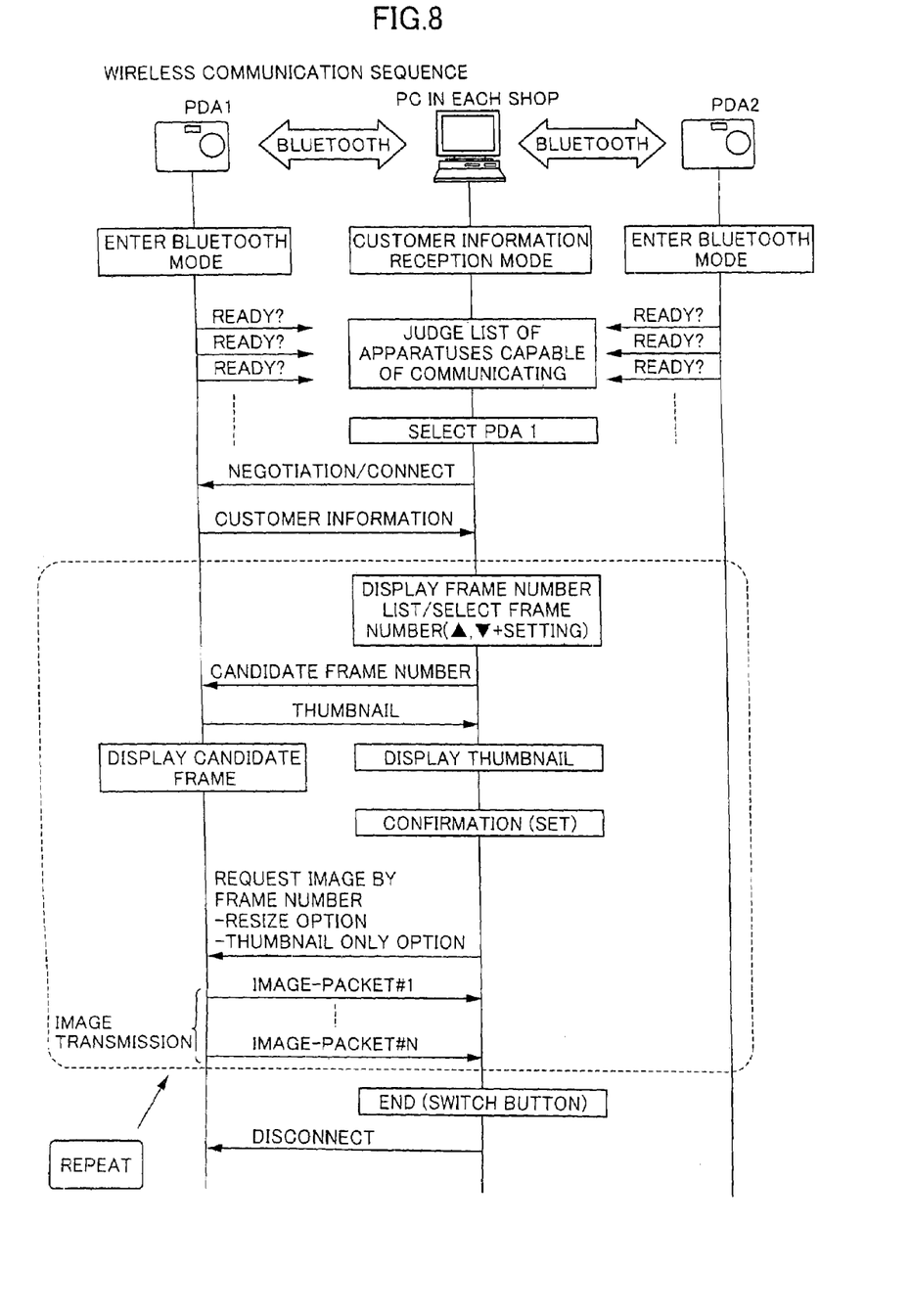
FIG. 8 is a diagram showing a wireless communication sequence which is carried out between PDAs carried by customers and a client computer.

In that case, the customer 10 inputs the customer information to the PDA 30 in advance in S30 "input customer information". Then, when the customer 10 enters a communication zone in which the PDA 30 and the client PC 80 (or the client PCs 80A, 80B, etc.) are capable of carrying out short-range wireless communication, for example, the PDA 30 responds to a connection request outputted by the client PC 80 and sends a control packet indicating a device address, clock, and the like to the client PC 80. Next, the client PC 80 sends and receives an ID packet including a device access code and an inquiry code based upon the response of the PDA 30 and carries out communication connection processing with the PDA 30 (see FIG. 8).

When communication is established between the communication apparatuses, the PDA 30 performs processing for sending the desired product information and the customer information to the client PC 80. The CPU 880 of the client PC 80, to which these customer information and the like are inputted via the transmission and reception device 857, reads out the shop information recorded in the recording device 886 and sends the shop information to the server 90 via the transmission and reception device 865 and the communication network such as the Internet together with the inputted customer information and the like.

The customer information and the shop information are received by the CPU 980 of the server 90 via the transmission and reception device 965. Then, in S92 "retrieve database shop information", the CPU 980 performs processing for retrieving a product which the customer desired to purchase or a keyword for the desired product out of the stocked product information recorded in the recording device 986.

In the case in which the CPU 980 has retrieved a plurality of desired products, the CPU 980 reads out the location information and the price information of shops recorded in the recording device 986 in association with the stocked product information, and prioritizes shops close to the customer 10 to prepare a shop list to be sent or prioritizes shops setting low prices for the desired products to prepare a shop list to be sent.

When the product desired by the customer 10 is retrieved out of the stocked product information in S92, the CPU 980 of the server 90 performs processing for sending a name of the retrieved product, information on a shop selling the product (information on a name and a location of the shop), and information such as a price to the client PC 80 closest to the customer 10 via the transmission and reception device 965 and the communication network.

The CPU 880 of the client PC 80 having received the stocked product information from the server 90 performs processing for sending the received stocked product information to the PDA 30 carried by the customer via the transmission and reception device 857. Upon receiving the stocked product information, in S36 "display a list of stock holding shops", the PDA 30 emits a calling sound, which indicates that the information on shops holding the stocked product has been received, to the customer 10 and, at the same time, performs processing for displaying the received shop information on the display device of the PDA 30 to notify the customer 10 of the reception.

The customer 10 looks at the shop information (location information of shops and the product names) displayed on the display device of the PDA 30, whereby it becomes possible for the customer 10 to learn in which shop in the shopping mall the product which the customer 10 desired to purchase or a product similar to the product is sold.

The display device of the PDA 30 indicates in which shop in the shopping mall the product which the customer 10 desires to purchase is held, whereby it becomes possible for the customer 10 to immediately head toward the shop holding the product which the customer 10 desired to purchase. In the case in which the product which the customer 10 desires to purchase is held in a plurality of shops, names of the shops and existing locations of the shops are displayed in an order of closeness to a location where the customer 10 presently exists, whereby it becomes possible for the customer 10 to purchase the product in a shop close to the customer 10.

A price of the product which the customer 10 desires to purchase is displayed on the display device of the PDA 30, whereby it becomes possible for the customer 10 to learn the price and decide to purchase the product without actually visiting a shop. In the case in which the product which the customer 10 desires to purchase is held in a plurality of shops, a price of the product is displayed for each shop, whereby it becomes possible to purchase the desired product in a shop providing the product at a lowest price.

Further, the CPU 980 of the server 90 retrieves customer information in S94 "retrieve database customer information" to recognize the customer 10 who has approached a predetermined client PC (the client PC 80A or the like installed in a shop), and performs processing for sending the customer information to the client PC 80A or the like existing close to the customer 10.

In S88 "display a requesting customer list", the CPU 880 of the client PC 80 or the like performs processing for displaying the customer information received from the server 90 on the display device 868. Here, the customer information displayed on the display device 868 is information on the product which the customer 10 desires to purchase, information on desire to purchase, information on a method of payment of a price of the product, information on the face image of the customer 10, and the like. This customer information may be sent to a PDA carried by a shop clerk of a shop and displayed on a display device of the PDA.

By displaying the customer information on the PDA of the shop clerk, it becomes possible for the shop clerk calling in customers in front of the shop to immediately learn that the customer 10 will visit the shop. The shop clerk looks at the face image of the customer 10 displayed on the display device, whereby it becomes possible for the shop clerk to immediately specify the customer 10 who desires to purchase the product held in the shop and to serve the customer 10 quickly.

When the customer 10 has purchased the product in any shop, it is possible to input product purchase information including information on the purchase product or product sales information including information on the product sold by the shop from the client PC 80 or the like via the input device 874 or the like. The product purchase information or the product sales information may be inputted by the shop clerk or the customer via the input device 874 such as a keyboard or a mouse, or may be inputted via the input device 874 such as a barcode reader.

When input of information on the sales or the like of the product has ended in S70 "input product purchase information or product sales information", next, the CPU 880 performs processing for sending the inputted product purchase information or product sales information to the server 90 via the transmission and reception device 865 and the communication network 860 such as the Internet.

When the server 90 has received the product purchase information via the transmission and reception device 965, the processing carried out by the CPU 980 of the server 90 proceeds to processing of S96 "update customer information and stocked product information", and the CPU 980 performs processing for deleting various kinds of information such as the purchased desired product, desire to purchase, and the method of payment from the "customer information" of the customer who has purchased the desired product and has been satisfied and updating the customer information.

Further, when the server 90 has received the product sales information via the transmission and reception device 965, in S96 "update customer information and stocked product information", the CPU 980 of the server 90 performs processing for deleting information on the sold product from the stocked product information recorded in the recording device 986 and updating the stocked product information.

On the other hand, when the customer has inputted information, which indicates that a product desired to be purchased is added or is changed or cancelled, via the input device of the PDA 30 in S38 "update customer information", the PDA 30 performs processing for wirelessly transferring the inputted "customer information" to the closest client PC 80 or the like.

For example, the CPU 880 of the client PC 80 receives the new customer information via the transmission and reception device 857 and sends the customer information to the server 90 via the transmission and reception device 865. The CPU 980 of the server 90 receives the sent new customer information via the transmission and reception device 865. Then, when the server 90 has received the product purchase information via the transmission and reception device 965, the processing carried out by the CPU 980 of the server 90 proceeds to S96, and the CPU 980 performs processing for updating the customer information of the customer.

For example, when the customer leaves the shopping mall and the PDA 30 exits from the wireless communication zone of the client PC 80, 80A, or the like, the processing carried out by the CPU 880 of the client PC 80, 80A, or the like proceeds to S72 "disconnect communication" or S89 "disconnect communication", and the CPU 880 performs processing for disconnecting the wireless communication, which has been carried out between the client PC 80, 80A, or the like and the PDA 30, and detects that the wireless communication has been disconnected. When the processing for disconnecting the wireless communication has ended, the CPU 880 of the client PC 80, 80A, or the like sends information, which indicates that the wireless communication with the PDA 30 carried by the customer has been disconnected, (wireless communication disconnection information) to the server 90 via the transmission and reception device 865 and the communication network 860.

When the server 90 has received the wireless communication disconnection information via the transmission and reception device 965, the processing carried out by the CPU 980 of the server 90 proceeds to S96, and the CPU 980 performs update processing for deleting "customer information" of the customer for whom the communication has been disconnected.

In this way, in the case in which the customer has purchased the product, in the case in which the customer himself/herself has updated the customer information, in the case in which the customer has left the shopping mall, or the like, it becomes possible to update the customer information and the stocked product information in the server 90, and it becomes possible to dispose of unnecessary data and store and utilize only necessary data.

Moreover, in the CPU 980 of the server 90, the processing of S98 "in the case in which the management period has elapsed, delete customer information and stocked product information" is carried out periodically, whereby it becomes possible to uniformly dispose of unnecessary data. In S98, the CPU 980 performs processing for comparing the management period of the stocked product information recorded in the recording device 986 and date or time counted by the calendar clock 990 to judge whether or not the management period has elapsed and, if it is judged that the management period has elapsed, deleting the stocked product information recorded in association with the management period. By performing the processing of S98, it becomes possible to uniformly dispose of customer information and stocked product information which have passed a predetermined management period.

As described above, according to the present invention, information on shops dealing in a product desired by a customer in a shopping mall or the like can be provided to the customer through a portable apparatus carried by the customer and, on the other hand, the shop can acquire information on the customer desiring to purchase a product (stocked product) held by the shop itself and can approach the customer for sale of the product.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A customer solicitation support system, comprising:
    a portable apparatus which is carried by a customer;
    a plurality of client computers which are installed in shops and wirelessly communicate with the portable apparatus; and
    an information provision server which communicates with the plurality of client computers,
    the portable apparatus comprises:
        a portable apparatus transmission device which sends desired product information which indicates a desired product which the customer who carries the portable apparatus desired to purchase and customer information for specifying the customer to one of the client computers which is closest to the customer who carries the portable device;
        a portable apparatus reception device which receives shop information which indicates shops having stock of the desired product indicated by the customer information from said one of the client computers;
        a portable apparatus display device which displays the shop information which is received by the portable apparatus reception device; and
        a portable device input device which inputs the desired product information associated with the product desired by the customer wherein the portable device input device enables inputting a face image of the customer together with the desired product information and the customer information, and wherein the portable apparatus transmission device sends the inputted face image together with the desired product information and the customer information to said one of the client computers;
    each of the client computers comprises:
        a first client computer reception device which receives the desired product information and the customer information from the portable apparatus;
        a first client computer transmission device which sends the desired product information and the customer information to the server;
        a second client computer reception device which receives the shop information which indicates the shops having stock of the desired product indicated by the customer information from the server; and
        a second client computer transmission device which sends the shop information to the portable apparatus,
    the server comprises:
        a server reception device which receives the desired product information and the customer information from said one of the client computer;
        a customer information database which stores the desired product information in association with the customer information of each customer;
        a stock information database which stores stocked product information indicating stocked products of each shop in association with the shop information of each shop in which the client computer is installed;
        a retrieving device which retrieves the stocked product information which coincides with the desired product information from the stock information database; and
        a server transmission device which sends the shop information associated with the retrieved stocked product information which is retrieved by the retrieving device to said one of the client computers.

2. The customer solicitation support system as defined in claim 1, wherein each of the client computers comprises a client computer display device which displays the face image of the customer and desired product information,
    wherein the retrieving device of the server retrieves the stocked product information which coincides with the desired product information from the stock information database, and
    wherein the server transmission device sends the face image of the customer and the desired product information to the client computer which is installed in the shop which is indicated by the shop information associated with the retrieved stocked product information.

3. The customer solicitation support system as defined in claim 1, wherein the shop information includes location information of the shops.

4. The customer solicitation support system as defined in claim 3,
    wherein the server comprises a customer existing location detection device which detects an existing location of the customer, and
    wherein the server transmission device sends the shop information of the shop close to the existing location of the customer, which is detected by the customer existing location detection device, preferentially to the portable apparatus via said one of the client computers among the shop information associated with the retrieved stocked product information.

5. The customer solicitation support system as defined in claim 4,
    wherein each of the portable apparatus transmission device, the portable apparatus reception device, the first client computer reception device and the second client computer transmission device is a short-range wireless communication device which performs wireless communication only in a predetermined communication area, and
    wherein the customer existing location detection device of the server detects the customer existing location based upon an installation location of the client computer which has sent the customer information to the server.

6. The customer solicitation support system as defined in claim 5, wherein each of the portable apparatus transmission device, the portable apparatus reception device, the first client computer reception device and the second client computer transmission device is a short-range wireless communication device of the Bluetooth standard.

7. The customer solicitation support system as defined in claim 1,
    wherein the stocked product information managed by the stock information database includes prices of the stocked products, and wherein the server transmission device sends the shop information of the shop, which sets low prices to the stocked products, preferentially to the portable apparatus via said one of the client computers among the shop information associated with the retrieved stocked product information.

8. The customer solicitation support system as defined in claim 1,
wherein each of the client computers comprises an input device which inputs stocked product information,
wherein each of the client computers sends the shop information to the server together with the stocked product information, and
wherein the server comprises a database management device which, upon receiving the stocked product information and the shop information, registers the stocked product information in the stock information database in association with the shop information.

9. The customer solicitation support system as defined in claim 1,
wherein each of the client computers comprises a client computer input device which inputs product purchase information indicating that the customer has purchased the desired product,
wherein each of the client computers sends the customer information to the server together with the product purchase information inputted by the client computer input device, and
wherein the server comprises a database management device which, upon receiving the product purchase information and the customer information inputted by the client computer input device, deletes the desired product information, which is registered in association with the customer information, from the customer information database together with the received customer information.

10. The customer solicitation support system as defined in claim 1,
wherein the server comprises a database management device which manages terms of validity for the desired product information registered in the customer information database and terms of validity for the stocked product information registered in the stock information database, respectively,
wherein the database management device deletes the desired product information from the customer information database if the term of validity for the desired product information has expired, and
wherein the database management device deletes the stock product information from the stock information database if the term of validity for the stock product information has expired.

11. The customer solicitation support system as defined in claim 1,
wherein each of the portable apparatus transmission device, the portable apparatus reception device, the first client computer reception device and the second client computer transmission device is a short-range wireless communication device which performs wireless communication only in a predetermined communication area,
wherein each of the client computers sends information which indicates whether or not the each of the client computer is wirelessly connected to the portable apparatus to the server, and
wherein the server comprises a database management device which deletes the customer information corresponding to the portable apparatus from the customer information database if the server receives the information which indicates that the portable apparatus is not wirelessly connected to the each of the client computers.

12. A customer solicitation support system comprising:
a portable apparatus which is carried by the customer;
a plurality of client computers which are installed in shops and wirelessly communicate with the portable apparatus; and
an information provision server which communicates with the plurality of client computers,
the portable apparatus comprises:
a portable apparatus transmission device which sends desired product information which indicates a desired product which the customer who carries the portable apparatus desired to purchase and customer information for specifying the customer to one of the client computers which is closest to the customer who carries the portable device;
a portable apparatus reception device which receives shop information which indicates shops having stock of the desired product indicated by the customer information from said one of the client computers; and
a portable apparatus display device which displays the shop information which is received by the portable apparatus reception device,
each of the client computers comprises:
a first client computer reception device which receives the desired product information and the customer information from the portable apparatus;
a first client computer transmission device which sends the desired product information and the customer information to the server;
a second client computer reception device which receives the shop information which indicates the shops having stock of the desired product indicated by the customer information from the server; and
a second client computer transmission device which sends the shop information to the portable apparatus,
the server comprises:
a server reception device which receives the desired product information and the customer information from said one of the client computer;
a customer information database which stores the desired product information in association with the customer information of each customer;
a stock information database which stores stocked product information indicating stocked products of each shop in association with the shop information of each shop in which the client computer is installed;
a retrieving device which retrieves the stocked product information which coincides with the desired product information from the stock information database;
a server transmission device which sends the shop information associated with the retrieved stocked product information which is retrieved by the retrieving device to said one of the client computers; and,
a customer information input apparatus which comprises:
an input device which inputs a face image of the customer carrying the portable apparatus together with the desired product information associated with the desired product desired by the customer; and
a customer information input apparatus communication device which communicates with the server and sends the desired product information and the face image of the customer inputted by the input device to the server.

13. The customer solicitation support system as defined in claim 12, wherein each of the client computers comprises a client computer display device which displays the face image of the customer and the desired product information, wherein the retrieving device of the server retrieves the stocked product information which coincides with the desired product information sent by the customer information input apparatus from the stock information database, and wherein the server transmission device sends the face image of the customer and the desired product information to the client computer which is installed in the shop which is indicated by the shop information associated with the retrieved stocked product information.

14. The information provision server as defined in claim 12, further comprising:

a database management device which manages terms of validity for the desired product information registered in the customer information database and terms of validity for the stocked product information registered in the stock information database, respectively, wherein the database management device deletes the desired product information from the customer information database if the term of validity for the desired product information has expired, and wherein the database management device deletes the stock product information from the stock information database if the term of validity for the stock product information has expired.

* * * * *